US 6,643,420 B2

(12) United States Patent
Han et al.

(10) Patent No.: US 6,643,420 B2
(45) Date of Patent: Nov. 4, 2003

(54) OPTICAL SUBASSEMBLY

(75) Inventors: Hongtao Han, Moovesville, NC (US); Michael R. Feldman, Charlotte, NC (US)

(73) Assignee: Digital Optics Corp., Charlotte, NC (US)

(*) Notice: Subject to any disclaimer, the term of this patent is extended or adjusted under 35 U.S.C. 154(b) by 0 days.

(21) Appl. No.: 10/178,337

(22) Filed: Jun. 25, 2002

(65) Prior Publication Data

US 2003/0123814 A1 Jul. 3, 2003

Related U.S. Application Data

(62) Division of application No. 10/032,911, filed on Dec. 28, 2001, now Pat. No. 6,533,471.

(51) Int. Cl.[7] .................................................. G02B 6/12
(52) U.S. Cl. ........................... 385/14; 385/14; 385/88; 385/89; 385/92; 385/94
(58) Field of Search .............................. 385/14, 33, 34, 385/49, 88, 89, 92, 94, 52, 93

(56) References Cited

U.S. PATENT DOCUMENTS

| 5,168,537 A | | 12/1992 | Rajasekharan et al. ........ 385/89 |
| 5,200,631 A | * | 4/1993 | Austin et al. ................ 257/570 |
| 5,319,725 A | * | 6/1994 | Buchmann et al. ........... 385/14 |
| 5,359,208 A | | 10/1994 | Katsuki et al. ............... 385/49 |
| 5,459,081 A | * | 10/1995 | Kajita ........................... 438/25 |
| 5,555,334 A | * | 9/1996 | Ohnishi et al. ................ 385/93 |
| 5,586,207 A | | 12/1996 | Goodwin ...................... 385/92 |
| 5,774,614 A | | 6/1998 | Gilliland et al. .............. 385/88 |
| 5,781,682 A | | 7/1998 | Cohen et al. ................. 385/89 |
| 5,790,730 A | | 8/1998 | Kravitz et al. ................ 385/49 |
| 5,913,002 A | | 6/1999 | Jiang ............................ 385/88 |
| 5,940,562 A | | 8/1999 | Henson et al. ................ 385/88 |
| 6,014,476 A | | 1/2000 | Meyer-Guldner et al. ..... 385/14 |
| 6,188,495 B1 | * | 2/2001 | Inoue et al. ................. 359/152 |
| 6,243,508 B1 | | 6/2001 | Jewell et al. .................. 385/14 |
| 6,374,004 B1 | * | 4/2002 | Han et al. ...................... 385/14 |
| 6,406,195 B1 | * | 6/2002 | Hammond et al. ........... 385/88 |
| 6,533,471 B2 | * | 3/2003 | Han et al. ..................... 385/92 |

FOREIGN PATENT DOCUMENTS

| DE | 197 42 895 | 4/1999 | ............... 385/14 X |
| WO | WO 99/24856 | 5/1999 | ............... 385/14 X |

* cited by examiner

Primary Examiner—Brian Healy
(74) Attorney, Agent, or Firm—Susan S. Morse

(57) ABSTRACT

An optical subassembly includes an opto-electronic device, an optics block and a spacer, separate from the optics block and providing spacing between the opto-electronic device and the optics block. The opto-electronic device, the optics block and the spacer are aligned and bonded together. This subassembly is particularly useful when coupling light between the opto-electronic device and a fiber. The optical subassembly may also include an opto-electronic device, an optics block and a sealing structure surrounding the opto-electronic device. The opto-electronic device, the optics block and the sealing structure are aligned and bonded together.

15 Claims, 3 Drawing Sheets

FIG. 5
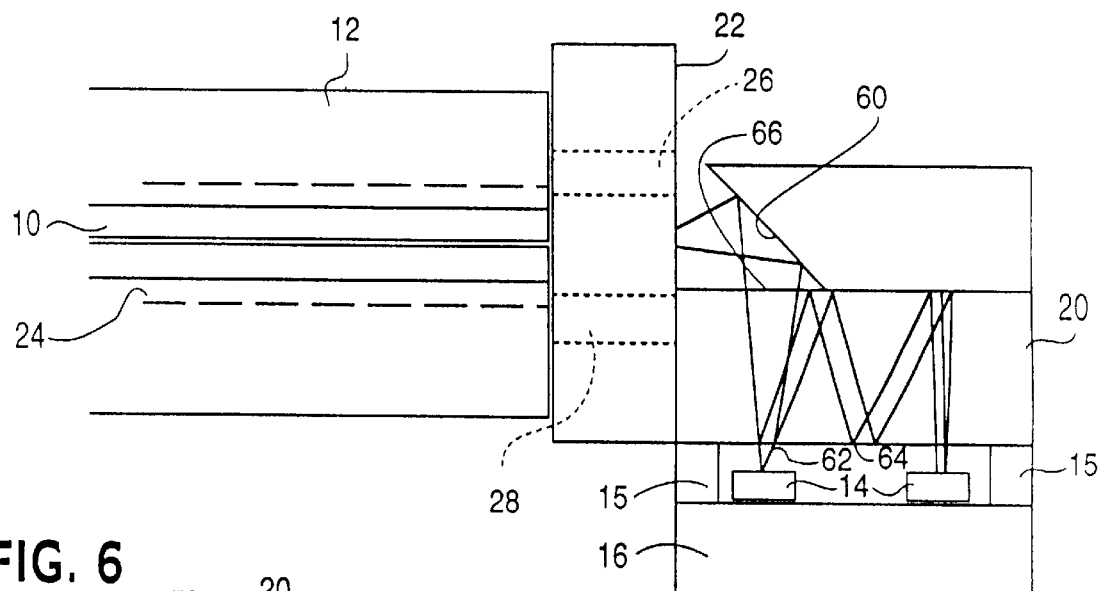
FIG. 6
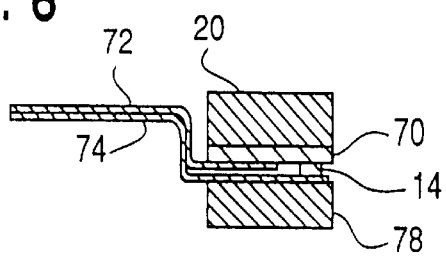
FIG. 7A
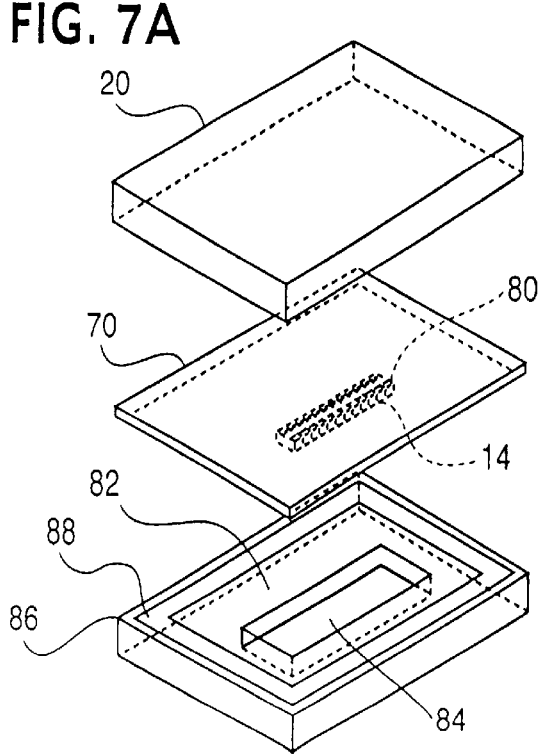
FIG. 7B

OPTICAL SUBASSEMBLY

CROSS-REFERENCES TO RELATED APPLICATIONS

The present application is a Divisional of application Ser. No. 10/032,911 entitled "Optical Subassembly" filed Dec. 28, 2001 now U.S. Pat. No. 6,533,471, which claims priority to U.S. Pat. No. 6,374,004 and is related to commonly assigned U.S. Pat. No. 6,406,195 entitled "Interface Between Opto-Electronic Devices and Fibers", the entire contents of all of which are hereby incorporated by reference for all purposes.

FIELD OF THE INVENTION

The present invention is directed to an optical subassembly with fibers, particularly for use in fiber communication systems.

DESCRIPTION OF RELATED ART

There are numerous ways to couple light to and from opto-electronic devices and fibers. One typical manner in which this is achieved is to butt couple the opto-electronic devices right up against the end faces of the fiber. Such butt-coupling requires active alignment to achieve desired levels of coupling efficiency. Further, butt-coupling does not allow the light beam to be modified. Finally, such butt-coupling typically requires close positioning of the opto-electronic devices in accordance with the spacing of the fibers, increasing crosstalk.

Another manner of achieving coupling between fibers and opto-electronic devices is to use short fibers, which in turn are coupled to the fibers. This allows surface emitting opto-electronic devices to be coupled with fibers, but still requires active alignment.

One passive alignment scheme proposed involves providing holes in all of the components to be aligned, e.g., a ferrule housing the fibers, a light-coupling device including optics and a substrate including the opto-electronic devices. Pins are then inserted into the holes to realize alignment of all the elements. Such single shot alignment may not be accurate enough for all applications. Further, the materials which can be used for the light coupling device are limited when the holes need to be provided therein. Finally, such alignment requires that there be a linear relationship among all of the components.

SUMMARY OF THE PRESENT INVENTION

The present invention is therefore directed to an optical subassembly which substantially overcomes one or more of the problems due to the limitations and disadvantages of the related art.

This and other advantages may be realized by providing an integrated active optical system including an opto-electronic device, an optics block, and a spacer, separate from the optics block, providing spacing between the opto-electronic device and the optics block, the opto-electronic device, the optics block and the spacer being aligned and bonded together.

The spacer and the optics block may be aligned and bonded on a wafer level prior to dicing. The spacer may surround the opto-electronic device. The system may further include a substrate, both a bottom of the opto-electronic device and the spacer being bonded to the substrate. The opto-electronic device may be bonded to the substrate on a wafer level prior to dicing. A top surface of the opto-electronic device may be bonded to the spacer and the spacer further include interconnection tracks. The opto-electronic device may be bonded to the spacer on a wafer level prior to dicing. The substrate, the optics block and the spacer may all be made of silicon. The system may be surface mounted to an electrical interface.

The opto-electronic device may include at least two opto-electronic devices. The at least two opto-electronic devices may be a light source and a light detector or may be an array of identical opto-electronic devices.

The above and other objects may further be realized by providing a system including a housing having a fiber, an opto-electronic device, and an optics block having two surfaces, each surface having an optical element thereon, the optics block coupling light between the opto-electronic device and the fiber, the housing, the opto-electronic device and the optics block being integrated together.

The opto-electronic device may include at least two opto-electronic devices and the fiber may include at least two fibers. The at least two opto-electronic devices may be separated from each other in at least one direction by more than the at least two fibers are separated from one another. The at least two opto-electronic devices may be separated from each other in at least two directions by more than the at least two fibers are separated from one another in each respective direction. The at least two opto-electronic devices may include a light source and a light detector or an array of identical opto-electronic devices.

The system may further include a spacer block between the optics block and the opto-electronic device. The system may further include a substrate, both a bottom of the opto-electronic device and the spacer being bonded to the substrate. A top surface of the opto-electronic device may be bonded to the spacer and the spacer may further include interconnection tracks.

The optical axis of the fiber and the optical axis of the opto-electronic device may be at an angle. The system may further include a reflective surface directing light between the opto-electronic device and the fiber. At least one optical element on the optics block may homogenize light. The system may be surface mounted to an electrical interface. The optical elements on the optics block may be made on a wafer level.

The above and other objects of the present invention may be realized by providing a system including an opto-electronic device, an optics block having at least one optical element thereon, and a sealing structure surrounding the opto-electronic device, the opto-electronic device, the optics block and the sealing structure being integrated.

The system may be surface mounted to an electrical interface. The system may include a spacer between the optics block and the opto-electronic device. The sealing structure may include a bottom surface of the optics block and the spacer. An optical element may be provided on the spacer.

The system may include a substrate receiving the opto-electronic device therein. The sealing structure may include the substrate and a bottom surface of the optics block. The system may include a spacer block between the optics block and the opto-electronic device. The sealing structure may include the substrate and a bottom surface of the spacer. The substrate may have vias there through connecting the opto-electronic device to other systems. The opto-electronic device may be in contact with the substrate, the substrate serving as a heat sink for the opto-electronic device.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 5 is a cross-sectional side view of another embodiment of the interface of the present invention;

FIG. 6 is a cross-sectional side view of another embodiment of the optical subassembly of the present invention;

FIG. 7A is an elevational exploded view of another embodiment of the optical subassembly of the present invention; and FIG. 7B is an exploded side view of the configuration shown in FIG. 7A.

DETAILED DESCRIPTION OF PREFERRED EMBODIMENTS

Figure 1A:
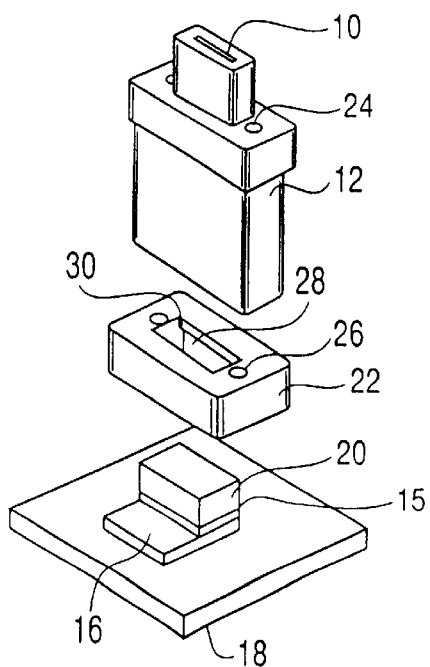
FIG. 1A is an exploded elevational perspective view of an interface of the present invention in conjunction with the fibers in a housing and the opto-electronic devices.
Figure 1B:
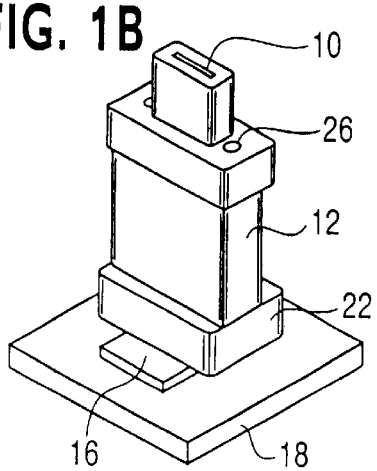
FIG. 1B is an elevational perspective view of the system of FIG. 1A.
Figure 1C:
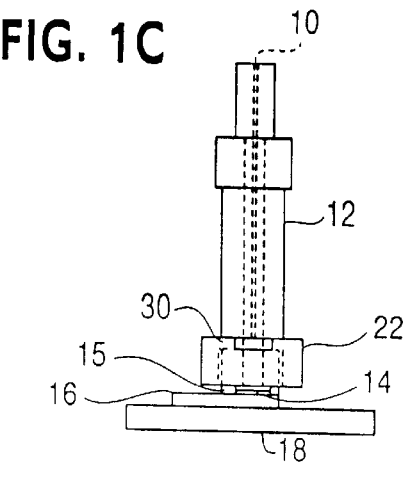
FIG. 1C is a side view also illustrating internal features of the system of FIG. 1B.
Figure 1D:
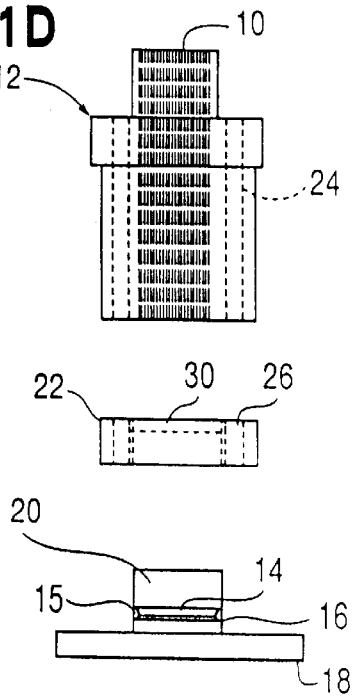
FIG. 1D is an exploded front view also illustrating internal features of the system of FIG. 1B.
Figure 1E:
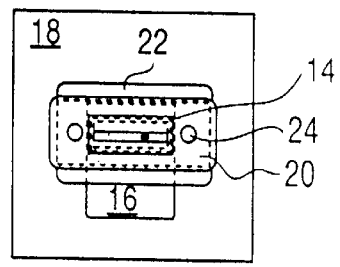
FIG. 1E is a top view of the system of FIG. 1B.
Figure 1F:
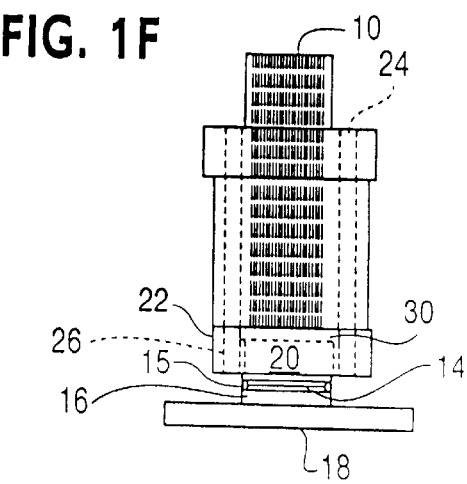
FIG. 1F is a front view of the system of FIG. 1B.

As can be seen in FIGS. 1A–1F, a plurality of fibers 10 are inserted into a ferrule 12. Opto-electronic devices 14 which are to be in communication with the fibers 10 are preferably provided on a silicon bench or sub-mount 16. In turn, this silicon bench 16 is preferably provided on a substrate 18. An optics block 20 provides at least one optical element between each opto-electronic device 14 and a corresponding fiber 10. The optics block 20 is preferably spaced from the opto-electronic devices 14 by a spacer 15. The optical elements preferably include elements which collimate, focus and/or homogenize the light. Since the optics block has two surfaces, two optical elements may be provided thereon. Further, if required, additional optics blocks may be bonded to and spaced from the optics block 20 to provide additional surfaces.

A mechanical interface 22 aligns the optics block 20, which is already aligned with the optical devices 14 and with the mechanical interface 22, with the fibers 10. This may be achieved by alignment features on both the mechanical interface 22 and the ferrule 12 housing the fibers 10. In the particular example shown, these alignment features consist of holes 24 in the ferrule 12, which are already typically present for aligning the ferrule with other devices, and alignment holes 26 in the mechanical interface 22. Once these alignment holes 24, 26 are aligned, an alignment pin, not shown, may then be inserted therein to maintain the aligned position.

The provision of separate elements to provide the mechanical interface and the optical interface provides several advantages. For example, the provision of the alignment holes 26 in the mechanical interface 22 allows the optics block to be made of a material selected for its optical properties. For example, the optics block may be made of glass, which is preferable for forming optics therein. However, it is difficult to accurately form cylindrical holes in glass. Thus, this material would not be suitable if the holes had to be provided therein as well, i.e., if the mechanical and optical interface were to be realized by single element. Further, since the mechanical interface is to accept the alignment pins, it must be of sufficient size to accommodate the pins. Glass may be too fragile for such a purpose. Finally, glass is able to withstand the heat such as during soldering of the device to a printed circuit board or other electrical interface. Thus, the system may be surface mounted or pluggable to an electrical interface.

The mechanical interface may similarly be made of a material best suited for its function. The mechanical interface 22 also preferably includes an aperture 28 which allows light to travel between the opto-electronic devices 14 and the fibers 10 without interference from the mechanical interface. This aperture also allows the mechanical interface to be made of any desired material, such as an opaque, thermally stable material in which holes may be accurately and easily formed, such as a glass filled plastic, ceramic or molded plastic, without regard to the optical properties thereof.

Further, in the particular example shown, the aperture 28 is made large enough to surround the optics block 20, except for at a lip 30, which in turn provides the desired separation between a top of the optics block 20 and an end face of the fibers. If the mechanical interface 22 is made of a material which is transparent to wavelengths of light being exchanged between the fibers and the opto-electronic devices, such an aperture 28 may no longer be needed. Some cut-out for accepting the optics block 20, with the remaining portion serving as a spacer, may still be desirable. Either configuration will result in no physical contact between the fibers 10 and the optics block 20.

Figure 2A:
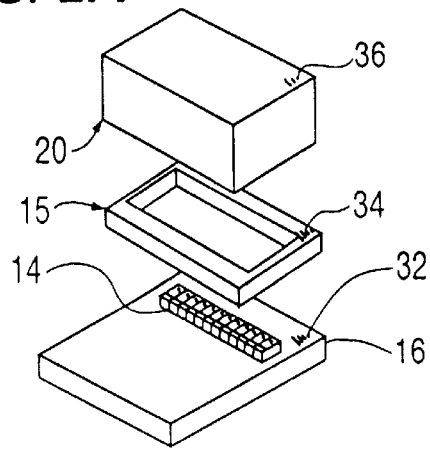
FIG. 2A is an exploded elevational perspective view of an optical subassembly of the present invention.
Figure 2B:
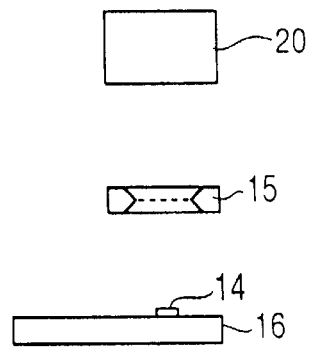
FIG. 2B is an exploded side view of FIG. 2A.

The alignment for the entire structure is discussed below in relation to FIGS. 2A–3. follows. FIGS. 2A–2B, show the alignment of the optics subassembly including the optics block 20 and the opto-electronic devices 14. First, the opto-electronic devices 14 are provided on the bench 16. Then, if the spacer 15 is being used, alignment features 34, such as fiducial marks, on the spacer 15 are aligned to alignment features 32, such as fiducial marks, on the bench 16. The spacer 15 is then bonded, e.g., using solder or epoxy, into place on the bench 16. The bevels which can be seen on the interior surface of the spacer 15 simply arise when using silicon as the spacer and the hole therein is formed by wet etching silicon along its crystalline plane. While wet-etching is a simple way of forming the hole in the spacer, vertical side walls may be more advantageous, e.g., for load bearing. Substantially vertical side walls may be realized by dry etching silicon. Further, other materials such as ceramic, glass, plastic, may be used for the spacer 15. If the spacer 15 is transparent to wavelengths of interest, the hole therein may not be required.

Then, alignment features 36, such as fiducial marks, on the optics block 20 are aligned with the corresponding features on the spacer 15 and the bench 16 to align the optics block to the opto-electronic devices 14. The optics block 20 is then bonded into place, e.g., using solder or epoxy, on the spacer 15. The optical elements on the optics block 20, as well as the alignment features 36, may be mass-produced on a wafer level and then diced to form individual optics blocks. Thus, only the alignment of the optical block 20 is required to align all of the optical elements thereon with the opto-electronic devices 14.

Preferably, the alignment and bonding of the spacer and the optics block occur on a wafer level, and then diced to form respective dies which are then aligned to the bench 16. The alignment of the spacer is not very sensitive, i.e., the spacer just needs to be aligned so that it does not block light between the optics block 20 and the opto-electronic device. While a spacer may be formed directly on the optics block itself, the use of a separate spacer 15 allows larger vertical separation to be achieved. The use of a separate spacer is particularly advantageous when providing optical elements on a bottom surface of the optics block 20, since the processes for forming the optics and the spacer features interfere with each other. Finally, use of a separate spacer allows the sealing off of the opto-electronic device 14 to be more readily and stably achieved. Such sealing protects the opto-electronic device 14 from environmental factors, such as humidity.

For certain wavelengths, e.g., in the near infrared, the optics block 20 may be made of another material, e.g., silicon. Then, all of the elements in the optical subassembly, i.e., the substrate, the spacer and the optics block, may be made of the same material, e.g., silicon. Making all of these elements of the same material reduces stress between these elements due to a difference in the thermal coefficient of expansion.

Figure 3A:
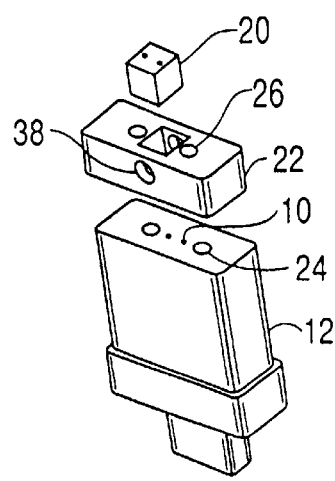
FIG. 3A is an exploded perspective view of the fiber housing and an interface of the present invention.
Figure 3B:
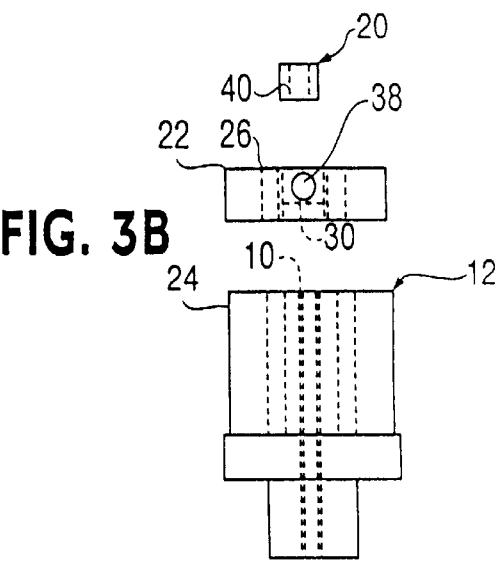
FIG. 3B is an exploded side view of FIG. 3A.

Alignment of the optics block 20 to the mechanical interface 22 and the fibers 10 is shown in FIGS. 3A–3B. While the optics block 20 has already been aligned with the opto-electronic devices 14, only the optics block 20 is shown for simplicity. In the particular example shown, the optics block 20 is to be passively aligned with the mechanical interface 22. Access holes 38 are provided in the mechanical interface to facilitate positioning of the optics block 20. When the mechanical interface is not to surround the optics block, the access holes 38 are not needed.

Such passive alignment may be realized using fiducial marks and/or mechanical mating features on the optics block 20 and the lip 30 of the mechanical interface 22. The lip 30 provides an optical mounting surface which maintains the optics block 20 at the desired distance from the end face of the fibers 10. Once aligned, the optics block 20, and thus the opto-electronic devices 14, are bonded to the mechanical interface 22. The mechanical interface 22, and all the components bonded thereto, are aligned to the housing 12 via alignment holes 24, 26 to complete the structure.

In addition to the passive alignment set forth above, in which alignment features are provided on the elements being aligned, passive alignment may also be realized using an alignment template and/or using the position of the holes for receiving the pins in the mechanical interface. Further, active alignment may also be used.

Figure 4A:
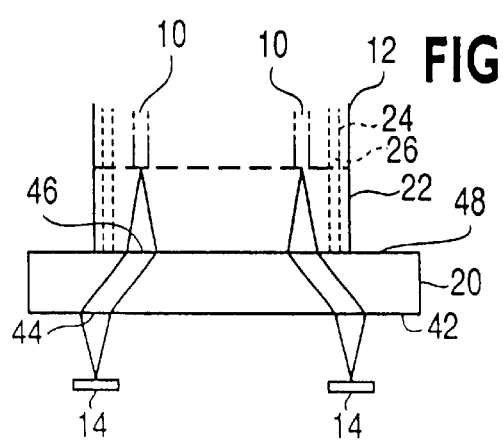
FIG. 4A is a front view of another embodiment of the optical interface of the present invention.

An alternative embodiment is shown in FIG. 4A. Here, the mechanical interface 22 does not surround the optics block, but rather is positioned on top of the optics block 20. The aperture 28 and the alignment holes 26 are still part of the mechanical interface 22, but the other features are not needed. Further, the alignment features may be included on the body of the mechanical interface 22, since the lip is no longer present.

By utilizing both surfaces of the optics block 20, the opto-electronic devices 14 may be placed further apart, while still realizing a compact system for delivering light between the opto-electronic devices 14 and the fibers 10. Such placement may reduce cross talk between the opto-electronic devices. As shown in FIG. 4A, assuming the opto-electronic devices are light emitters, optics 44 on a first surface 42 of the optics block 20 collimates and deflects light from the opto-electronic device 14. Optics 46 on a second surface 48 of the optics block 20 focuses light onto the fiber 10. Obviously, if the opto-electronic devices are detectors, the functioning of the optics would be reversed.

Figure 4B:
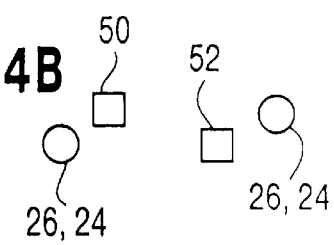
FIG. 4B is top view of the opto-electronic devices in relation to alignment holes.

The ability to place the opto-electronic devices further apart than the fibers is particularly advantageous when the system is a transceiver system, i.e., there is at least one light emitter and at least one light detector. This spacing may be further enhance by additionally separating the emitter and detector in a direction orthogonal to the direction shown in FIG. 4A. Such a configuration is shown in FIG. 4B, where a light emitter 50 is separated from a light detector 52 in two directions. While these elements are still between the alignment holes 24, 26, they are further apart than the fibers 10 and are also separated an orthogonal direction. Such separation minimizes crosstalk, while maintaining the original profile. Further, this separation can be realized even when the optics block is not larger than the mechanical interface.

A configuration employing the interface of the present invention where the fiber housing is positioned orthogonally to the plane of the opto-electronic devices is shown in FIG. 5. The alignment holes 24, 26 are still used to align the fiber housing 12 and the mechanical interface 22, the mechanical interface 22 is now aligned to the side of the optics block 20. In order to direct light between the fibers and the opto-electronic devices 14, a reflective surface 60 is provided. As shown in FIG. 5, this reflective surface 60 may be formed in glass or other materials. A metal coating may be provided on this surface to enhance the reflectivity thereof. The material having the reflective surface may then be bonded to a top surface of the optical block 20.

In the particular example shown in FIG. 5, the opto-electronic element 14 is a VCSEL and another opto-electronic element 14' is a power monitor for monitoring the power output by the VCSEL. A first element 62 on the optics block 20 splits off and collimates part of the beam output by the VCSEL and directs it to the power monitor. 14'. A second optical element 64 may be provided on the optics block 20 to focus the light onto the power monitor 14'. Details of such a configuration are set forth in commonly assigned, co-pending U.S. patent application Ser. No. 09/386,280 entitled "Diffractive Vertical Cavity Surface Emitting Laser Power Monitor and System" the entire contents of which are hereby incorporated by reference for all purposes.

Meanwhile, the undeflected portion of the light travels to a third optical element 66, where it is focused onto the fiber, after being reflected by the reflective surface 60. Thus, in accordance with the present invention, alignment may be realized using the alignment holes already available on the fiber housing without requiring that the components all be in the same plane. While a VCSEL array is discussed above, a detector array could be similarly positioned.

While all the previous configurations have illustrated the opto-electronic devices bonded on the bottoms thereof to a substrate 16, thereby requiring wire-bonding to realized their required electrical connections, FIGS. 6–7B illustrate bonding the top of the opto-electronic devices to the optics block. Since all the interconnections on the typical opto-electronic devices are provided on the top thereof, such bonding allows the use of wire bonding to be eliminated, which in turn allows more compact interconnections to be realized.

As shown in FIG. 6, the interconnections to the opto-electronic device 14 can be realized using a pair of flex leads, a signal flex lead 72 and a ground flex lead 74. An interconnect spacer 70 serves the same function as the previous spacer 15, but also includes interconnection tracks for connecting the opto-electronic element 14 to the signal flex lead 72. If space permits, interconnection tracks for the ground flex lead 74 may also be provided on the interconnect spacer 70. Otherwise, the ground flex lead 74 may be attached to the bottom of the opto-electronic device 14, as shown in FIG. 6. While shown as a separate element in FIG. 6, the interconnect spacer 70 may be integral with the optics block 20. The opto-electronic device preferably is mounted on a heat sink block 78. Thus, the module can be surface mounted or plugged into an electrical interface, e.g., a printed circuit board or flex circuit, without additional housing which may be needed to connect the wire bond configurations discussed above.

As shown in FIGS. 7A and 7B, another configuration eliminating the need for wire bonds includes again providing the interconnect spacer 70 to which the opto-electronic device 14, here a VCSEL array, is bonded. While shown as a separate element in FIGS. 7A and 7B, the interconnect spacer 70 may be integral with the optics block 20. Instead, of connecting the opto-electronic device 14 to flex leads, the interconnect spacer 70 now includes metal lines 80 on a bottom surface thereof, extending from the opto-electronic device 14. A chip carrier 86, preferably ceramic, has a hole 84 therein for receiving the opto-electronic device 14 therein. The chip carrier 86 is preferably attached to the spacer 80 using a sealing ring 88, e.g., any conventional adhesive.

The chip carrier 86 also includes a connection region 82 with vias to connect the metal lines 80 to the outside, e.g., through a bottom surface of the chip carrier. This may be accomplished, for example, using holes 90 through the chip carrier lined with metal. Thus, the module can be surface mounted or plugged into an electrical interface, e.g., a printed circuit board or flex circuit, without additional housing which may be needed to connect the wire bond configurations discussed above. While the configuration shown in FIGS. 7A and 7B has assumed all required connections for the opto-electronic device are on the top surface thereof, a ground connection could also be provided on the bottom surface.

When using a spacer which is transparent to wavelengths of interest and in the path of the radiation, such as shown in FIGS. 6–7B, the spacer may have optical elements formed thereon. For example, if the spacer and the optics block are made of the same material, there will not be an optical interface between them. Thus, a bottom surface of the spacer can be used on a second optical surface. The opto-electronic device could be slightly removed from this bottom surface even when bonded to the bottom surface, for example, providing a thick enough layer of bonding material. If a separate spacer is not used, the opto-electronic device may still be attached to the bottom of the optics block with this bonding spacing such that the optics block still provides two surfaces. If the spacer and the optics block are made of different material, optics may be provided on either surface of the spacer. Of course, additional optics block may be bonded together to provide the surfaces needed, but with a commensurate increase in thickness of the system.

It is further noted that the any of the individual components described in connection with a particular embodiment may be used with other configurations. For example, the opto-electronic device 14 as shown in FIGS. 6–7B, may be bonded to the bottom of the optics block in the configuration of FIGS. 1–2A.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by appended claims and their legal equivalents, rather than by examples given.

What is claimed is:

1. A system comprising:
    a mount supporting an opto-electronic device;
    an optics block having at least one optical element; and
    a spacer providing spacing between the opto-electronic device and the optics block, the spacer surrounding the opto-electronic device, the spacer and the optics block protecting the opto-electronic device from environmental factors, wherein at least two of the mount, the optics block and the spacer are aligned and secured on a wafer level prior to dicing.

2. The system of claim 1, wherein the system is surface mounted to an electrical interface.

3. The system of claim 1, wherein the environmental factors include moisture.

4. A system comprising:
    an opto-electronic device on a first substrate;
    an optics block having at least one optical element thereon and being transparent to light relayed between an optical waveguide and the opto-electronic device; and
    a second substrate receiving the opto-electronic device therein, wherein at least two of the optics block, the first substrate and the second substrate seal the opto-electronic device from environmental factors.

5. The system of claim 4, further comprising a spacer block between the optics block and the opto-electronic device.

6. The system of claim 4, further comprising vias through the second substrate connecting the opto-electronic device to other systems.

7. The system of claim 4, wherein the opto-electronic device is in contact with the second substrate, the second substrate serving as a heat sink for the opto-electronic device.

8. The system of claim 4, wherein the first substrate is a spacer between the optics block and the opto-electronic device.

9. The system of claim 4, wherein the first substrate is the optics block.

10. The system of claim 4, wherein the opto-electronic device comprises at least two opto-electronic devices.

11. The system of claim 10, wherein the at least two opto-electronic devices comprise a light source and a light detector.

12. The system of claim 10, wherein said at least two opto-electronic devices comprise an array of identical opto-electronic devices.

13. The system of claim 11, wherein the opto-electronic device comprises at least two opto-electronic devices.

14. The system of claim 13, wherein the at least two opto-electronic devices comprise a light source and a light detector.

15. The system of claim 13, wherein said at least two opto-electronic devices comprise an array of identical opto-electronic devices.

* * * * *